(12) United States Patent
Ng-Gee-Quan

(10) Patent No.: US 6,319,298 B1
(45) Date of Patent: *Nov. 20, 2001

(54) HEAT SHIELD AIR FILTER FOR VEHICLES

(76) Inventor: Wendell E. Ng-Gee-Quan, 30 Greenfield Ave., Unit 903, Toronto, Ont. (CA), M2N 6N3

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,612

(22) Filed: Oct. 27, 1999

(30) Foreign Application Priority Data

Sep. 2, 1999 (CA) .................................................. 2261919

(51) Int. Cl.⁷ ............................ B01D 35/14; B01D 29/00
(52) U.S. Cl. ................................ 55/331; 55/385.3; 55/521
(58) Field of Search ............................ 55/331, 521, 311, 55/385.3

(56) References Cited

U.S. PATENT DOCUMENTS

| | | | |
|---|---|---|---|
| 4,157,902 | * | 6/1979 | Tokar ...................................... 55/331 |
| 5,246,472 | * | 9/1993 | Herman et al. .................. 55/DIG. 30 |
| 5,606,854 | * | 3/1997 | Hoffmann ............................... 60/311 |
| 5,611,831 | * | 3/1997 | Matsuoka et al. ...................... 55/486 |

\* cited by examiner

Primary Examiner—David A. Simmons
Assistant Examiner—Robert A. Hopkins
(74) Attorney, Agent, or Firm—Eugene E. Renz, Jr., PC

(57) ABSTRACT

In a vehicle, it is known to have an air filter as part of an air intake system in vehicle's engine compartment. The air filter consists of a shape with a front narrow opening and a broader base. In the present invention, a new air filter is designed to provide an increased velocity of air passing through it. This new filter has firstly, a three dimensional conical device at the front opening of the filter, and secondly, a shield made of a low heat conductive material which surrounds the air filter and is mounted on a clamp at the bottom of the air filter.

1 Claim, 3 Drawing Sheets

HEAT SHIELD AIR FILTER FOR VEHICLES

BACKGROUND OF THE INVENTION

1. Field of the Invention

The present invention relates to an air filter for automobiles. The air filter is part of an air intake system, and this system allows the air to flow through into the vehicle's engine compartment.

2. Description of the Prior Art

It is common in automobiles to use a device known as air filter to let the air flow into the engine compartment. The bottom of the air filter is connected to the carburetor of the automobile by means of a pipe. The air enters this filter through a narrow opening at the top. The standard filter has a wire frame visible on the outside. This device, as it is used in automobiles, however, displays the drawback that there is no mechanism other than the narrow opening at the top to facilitate a faster stream of air to pass through the air filter. Also, the standard device used in the industry displays another drawback that it is susceptible to the transmission of heat from the engine compartment

SUMMARY OF THE INVENTION

It is an object of the invention to provide a device at the front opening of an air filter to facilitate a faster stream of air into the filter. The air filter consists of a shape with a front narrow opening, and a broader base which is connected to the carburetor by means of a pipe. This inventive device, with an aerodynamic design, increases the velocity of the air as it passed through the filter.

A further object of the invention is to provide a device which surrounds the air filter, to be called a "heat shield," which reduces the amount of heat transmittal from the engine compartment to the air filter. This innovation enables cooler air to pass through the filter.

The object of the two inventions is to allow a faster and cooler stream of air to pass through the air filter thereby giving rise to a new air filter for automobiles.

BRIEF DESCRIPTION OF THE DRAWINGS

The present innovation will be more fully understood by reference to the following detailed description thereof when read in conjunction with the attached drawings, and wherein.

DETAILED DESCRIPTION OF THE INVENTION

Figure 1:
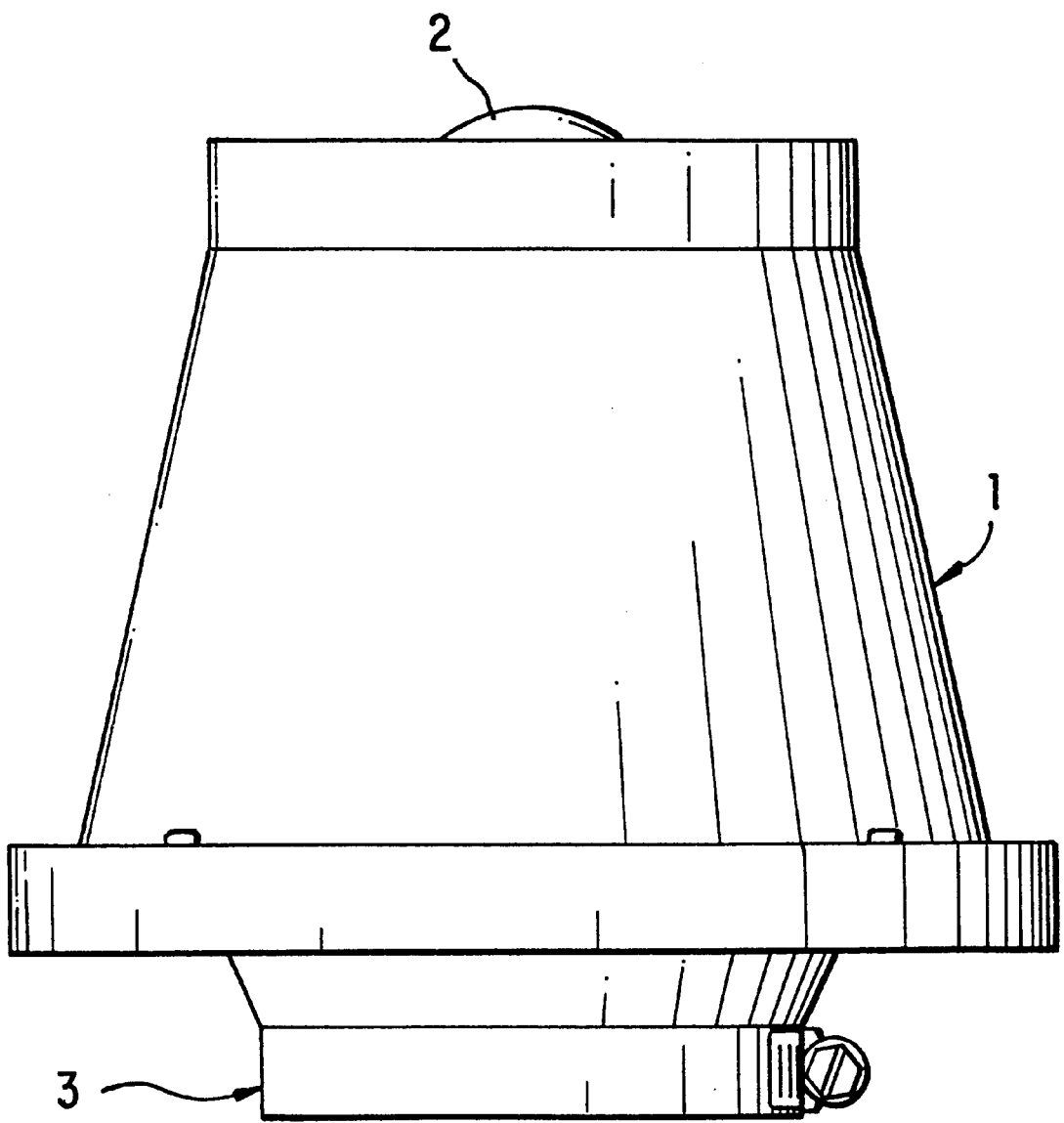
FIG. 1 is a side view of the new air filter.
Figure 2:
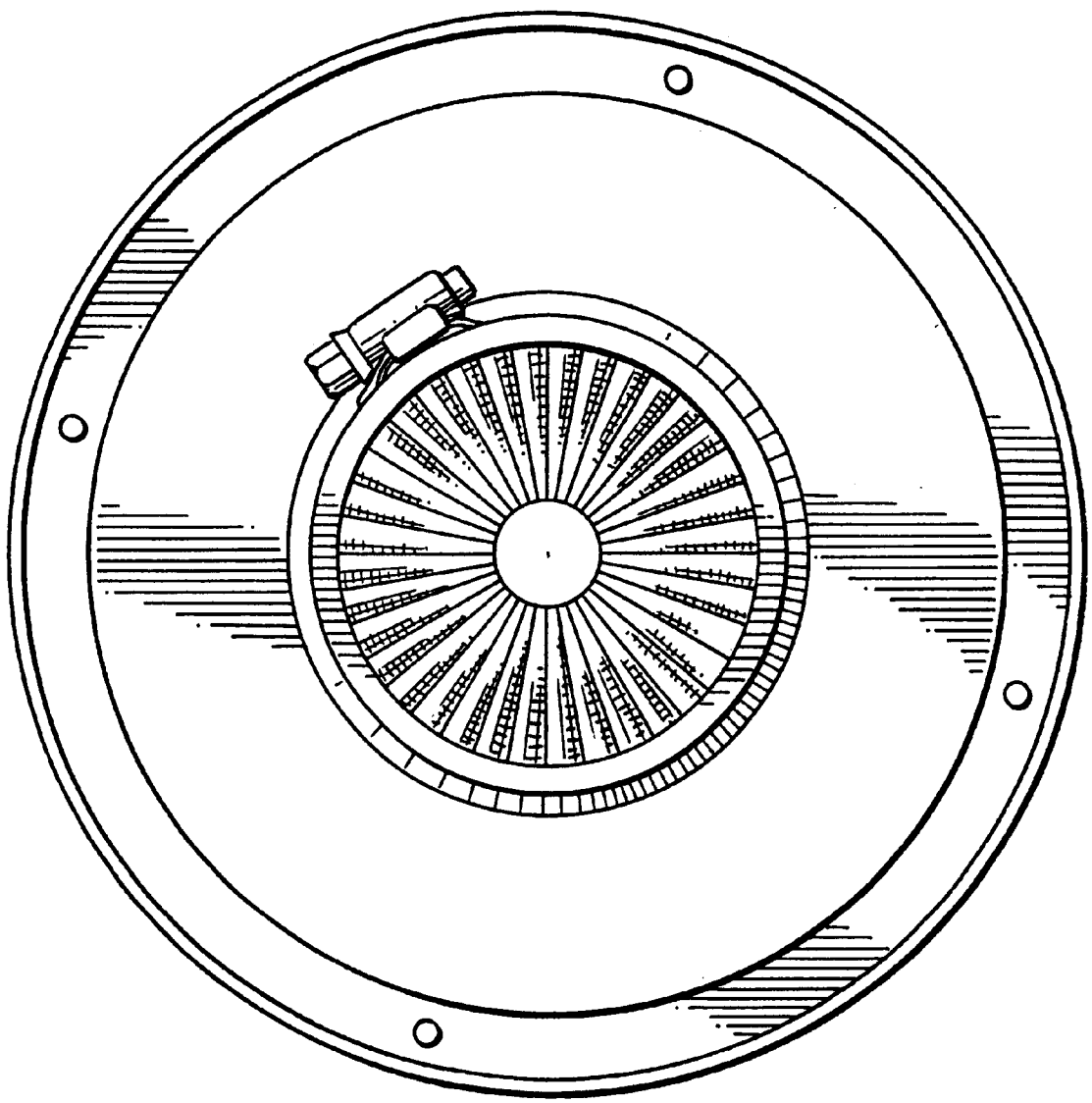
FIG. 2 is a top view of new filter.
Figure 3:
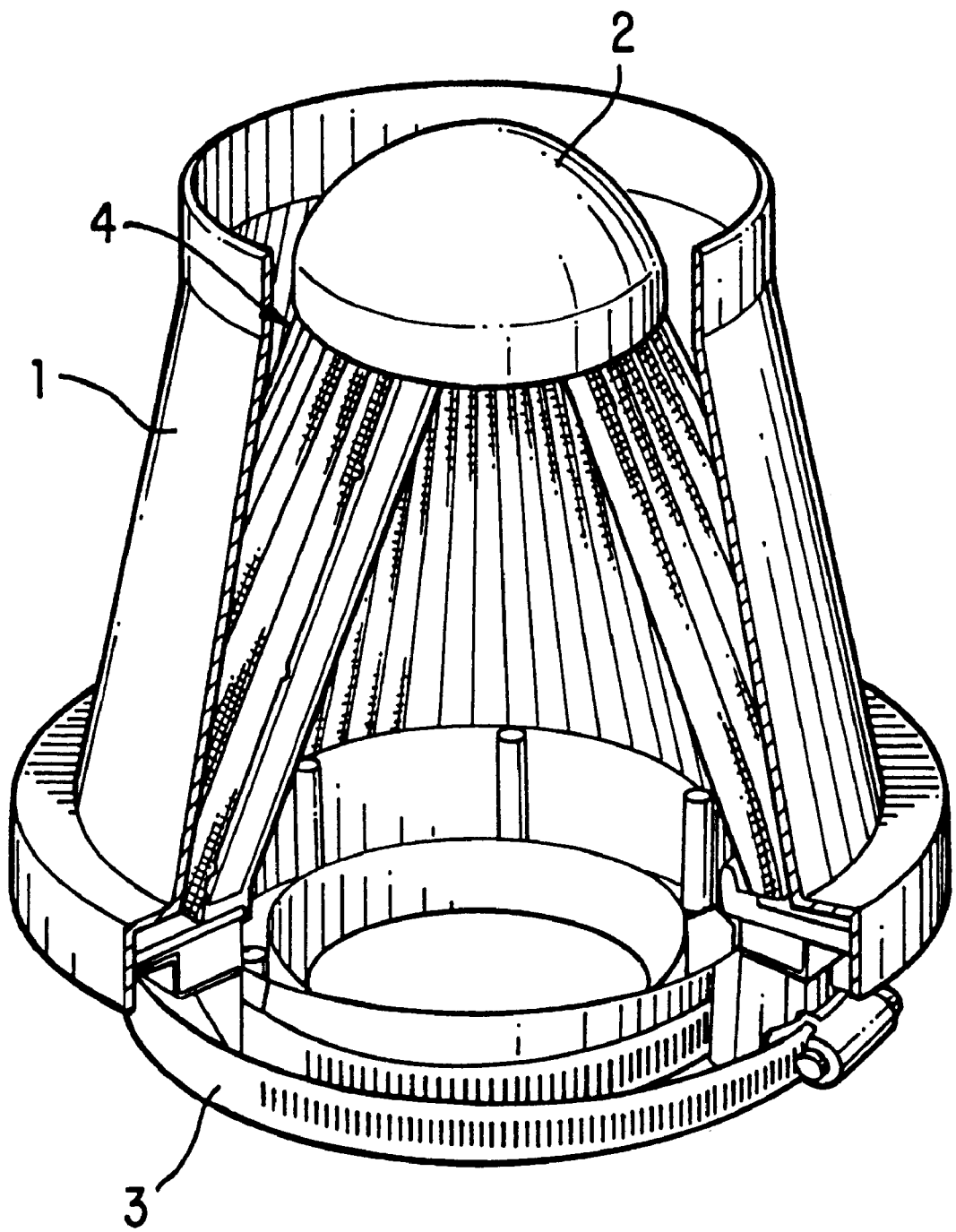
FIG. 3 is a sectional view of a preferred embodiment of a heat-shield and an aerodynamic device of the present inventions.

The air filter has a heat shield 1 made of a low heat conducting material such as high impact plastic, and an aerodynamic three dimensional conical shaped looking device 2 which is set at the top of an air filter 4. The heat shield 1 is mounted on a supporting clamp 3 and surrounds the air filter 4. The top of the heat shield 1 is narrower than the bottom which is mounted on 3.

I claim:

1. A combination comprising:

an elongated air filter of frusto-conical cross-section having a conical-shaped cap at its intake end;

a conically shaped heat shield surrounding the air filter made of a low heat conducting material mounted on a support clamp surrounding the air filter;

said heat shield flaring downwardly and outwardly from a top so that it has a narrower opening at the top adjacent the entrance end of the air filter than at its lower end which is mounted on the supporting clamp producing an aerodynamic design resulting in an increase in the velocity of the air as it passes through the filter to improve horsepower and torque when used in air flow intake systems for engines.

* * * * *